No. 664,533. Patented Dec. 25, 1900.
J. T. CLARK.
MACHINE FOR HULLING AND CLEANING RICE.
(Application filed Jan. 31, 1899.)

(No Model.) 2 Sheets—Sheet 1.

Witnesses
J. L. Edwards Jr.
H. J. Berube

James T. Clark, Inventor
By his Attorneys,
C. A. Snow & Co.

THE NORRIS PETERS CO., PHOTO-LITHO., WASHINGTON, D. C.

No. 664,533. Patented Dec. 25, 1900.
J. T. CLARK.
MACHINE FOR HULLING AND CLEANING RICE.
(Application filed Jan. 31, 1899.)
(No Model.) 2 Sheets—Sheet 2.
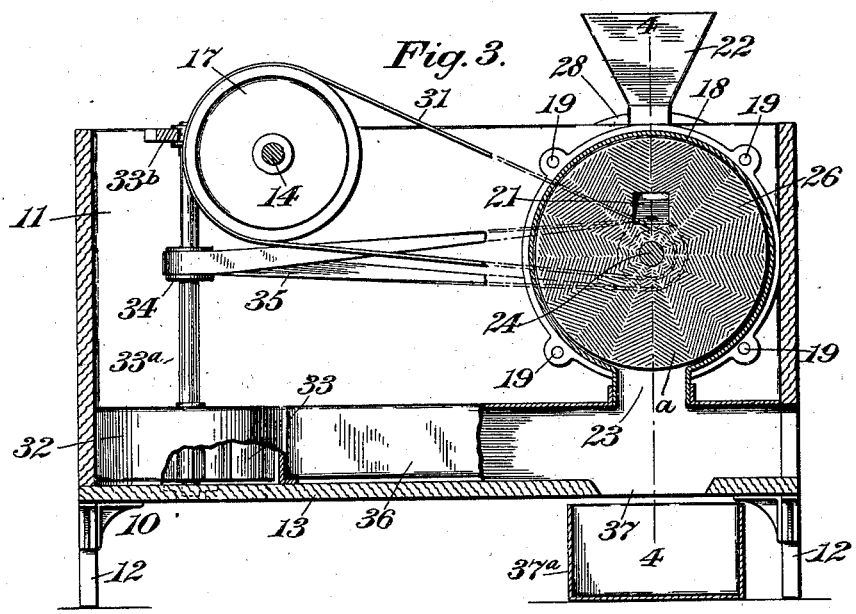
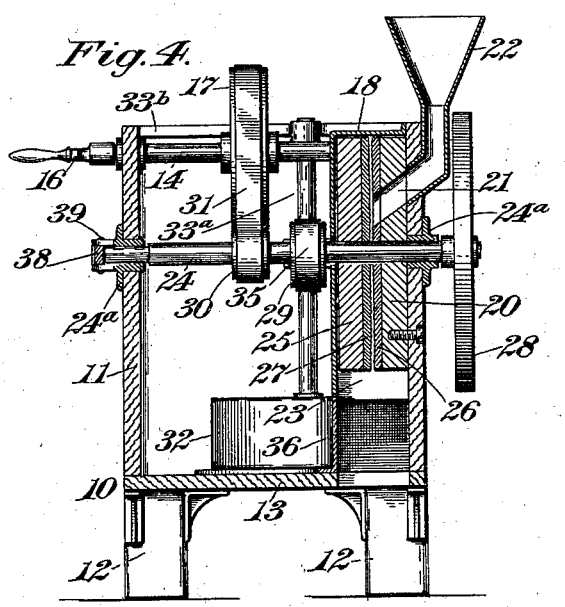
Witnesses
J. L. Edwards Jr.
H. F. Bernhard
James T. Clark, Inventor
By his Attorneys,
C. A. Snow & Co.

UNITED STATES PATENT OFFICE.

JAMES TAYLOR CLARK, OF LOANGO, ALABAMA.

MACHINE FOR HULLING AND CLEANING RICE.

SPECIFICATION forming part of Letters Patent No. 664,533, dated December 25, 1900.

Application filed January 31, 1899. Serial No. 703,993. (No model.)

*To all whom it may concern:*

Be it known that I, JAMES TAYLOR CLARK, a citizen of the United States, residing at Loango, in the county of Covington and State of Alabama, have invented a new and useful Machine for Hulling and Cleaning Rice, of which the following is a specification.

My invention is an improved machine for hulling, cleaning, and polishing rice, the object of my invention being to provide a light, cheap, simple, and portable machine which is adapted to be operated manually and is efficient in removing the husks from the rice, blowing off said husks and refuse, and polishing and cleaning the rice, the machine being especially adapted for use on rice plantations for treating the rough rice as it is harvested and fitting the same for the market.

My invention consists in the peculiar construction and combination of devices hereinafter fully set forth and claimed.

Figure 1:
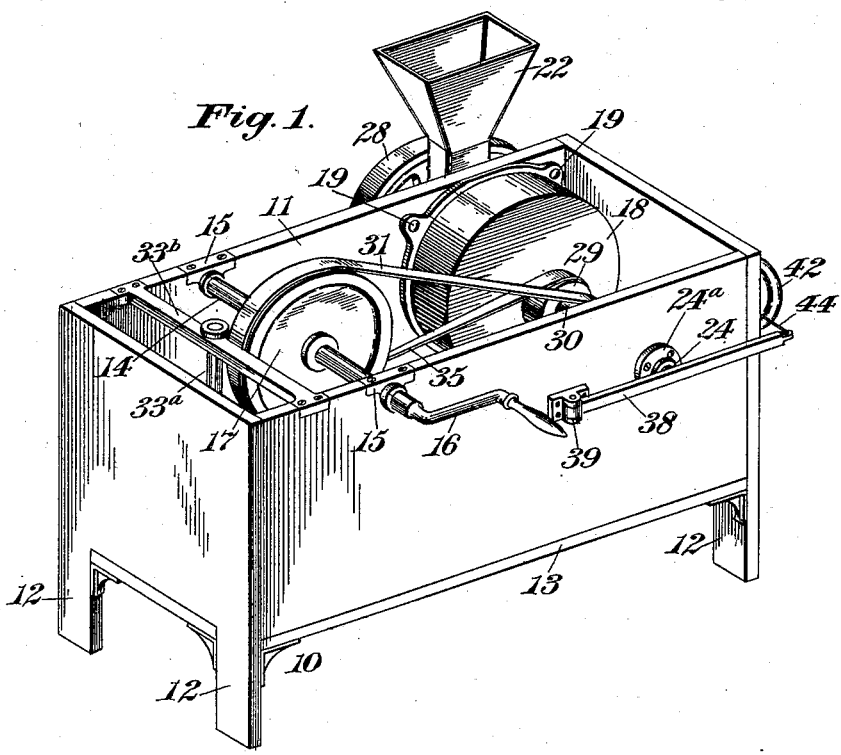
Figure 2:
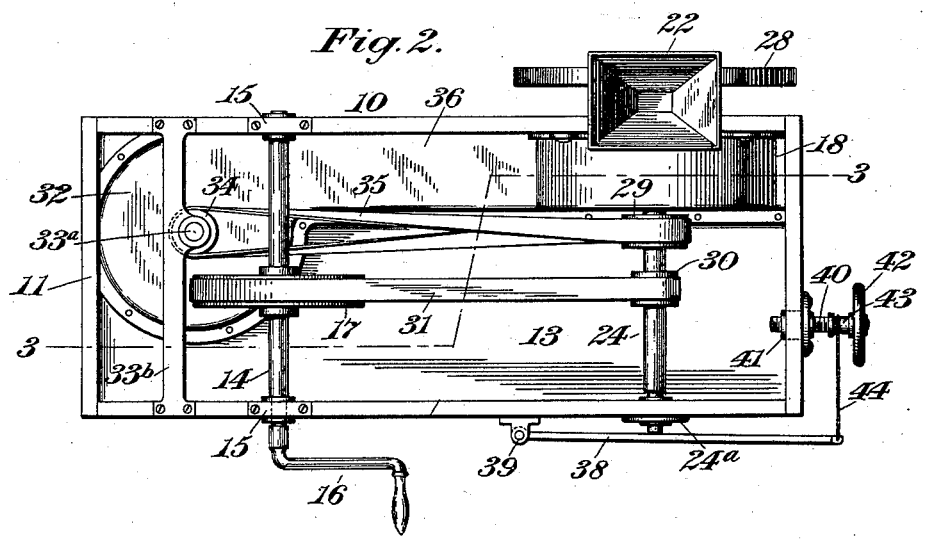

In the accompanying drawings, Figure 1 is a perspective view of a rice hulling, cleaning, and polishing machine constructed in accordance with my invention. Fig. 2 is a top plan view of the same. Fig. 3 is a longitudinal vertical section taken on a plane indicated by the line 3 3 of Fig. 2. Fig. 4 is a vertical transverse sectional view taken on a plane indicated by the line 4 4 of Fig. 3.

In the embodiment of my invention I provide a casing 10, which forms a complete inclosure at the sides and bottom and is provided at one end with a blast-opening and in the bottom with a discharge-opening 37. The said casing is supported on suitable legs 12, whereby it is raised a suitable distance above the ground or floor. The bottom board 13 supports the fan-casing and wind-trunk, which will be hereinafter described. A fixed hulling-disk 20 is secured in a vertical position on the inner side of one of the side walls 11 of the casing and has a feed-port 21 extending transversely therethrough at a suitable distance above the center thereof. The said feed-port registers with an opening in the side of the casing, as shown in Fig. 4. A shaft 24 is journaled in bearings 24ª in the side walls of the casing. The said shaft is adapted to move endwise a slight distance in its bearings and carries the revoluble hulling-disk 25, which coacts with the disk 20, the longitudinal movement of the shaft 24 enabling the hulling-disks to be relatively adjusted as may be required. On one end of the said shaft 24 is a fly-wheel 28. Pulleys 29 and 30 are secured on said shaft. A lever 38 is arranged in a horizontal position on the outside of the machine-casing adjacent to one end of the shaft 24. This lever is fulcrumed, as at 39, to the casing 11 and bears against one end of shaft 24, which projects through and beyond the side wall of the casing. A regulating-screw 40 has a threaded length engaging a bearing 41, attached to one end of the casing 11, and this screw is provided with a head or hand-wheel 42, whereby it may be readily turned. The screw is further provided with a smooth length or section 43, to which is fastened one end of a cord or chain 44, the latter being attached to the free end of the lever 38. By this means the shaft 24 may be moved endwise to adjust the revoluble disk 25, as will be understood. The opposing faces of the disks 20 25 are covered with working disks 26 27, which are made of hard rubber, and their opposing working faces are dressed or roughened in any suitable manner, preferably as indicated in Fig. 3 of the drawings, by being laid off in segmental lands *a*, traversed by grooves which are angularly disposed with relation to each other in the respective lands, whereby the rice is subjected to a maximum degree of attrition between the said working disks, and the efficiency of the latter for hulling and polishing the rice is materially increased. A hopper 22, secured to one side of the casing, discharges into the feed-port 21 of stationary hulling-disk 20.

In the upper part of the frame or casing 11 and near one end thereof is a horizontal power-shaft 14, which is journaled in suitable bearings 15, one end of this shaft being extended beyond one side of the casing and having an operating-crank 16 attached thereto. This crank provides means by which the machine may be conveniently operated by hand-power; but if it be desired to operate the machine by steam or other power a suitable pulley may be employed instead of the hand-crank, as will be understood. A pulley 17 on the shaft 14 is connected to the pulley 30 on shaft 24 by a belt 31, which conveys power from said shaft 13 to said shaft 24.

The pulley 17 is of much greater diameter than the pulley 30, and hence the shaft 24 is rotated at a much higher rate of speed than the shaft 14.

A vertical shaft 33$^a$ has its upper end journaled in a bearing in a cross-bar 33$^b$, which connects the side walls of the casing near one end thereof. The lower end of the said shaft is stepped in a bearing in the bottom 13 of of the casing, as indicated in dotted lines in Fig. 3. The said shaft has a pulley 34, which is driven by endless belt 35, operated by the pulley 29. The said shaft 33$^a$ carries at its lower end, immediately above the bottom of the casing, a blower-fan 33, which is horizontally disposed as shown. The casing 18 is formed of metal, shaped as shown, and serves, in connection with one side of the casing 10, to inclose the scouring and hulling mechanism, the said casing 18 being provided with outturned lugs 19, which bear against and are secured to the inner side of the side wall 11 of casing 10, to which the fixed disk 20 is secured. In the lower side of said casing 18 is a discharge-trunk 23, through which the material falls from the scourer mechanism to the discharge-opening 34 in the bottom of casing 10. The casing 32 for the fan is formed of metal, shaped as shown, and in connection with the bottom 13 of casing 10 said casing 32 incloses the fan. The blast-trunk 36 is formed integrally with the casing 32 and is secured on the bottom of casing 10 with said casing 32, the bottom of the casing 10 forming the lower side of said blast-trunk. The latter extends to the blast-opening in one end of the casing 10 and is connected to and communicates with the trunk 23 of casing 18, and in the operation of the machine the material which is discharged from the scouring and hulling mechanism in falling across the blast-trunk is subjected to the winnowing action of the blast from the fan, the husks and refuse matter being discharged through the blast-opening at the outer end of the blast-trunk and the rice that has been cleaned, polished, and hulled falling through the discharge-opening 37 in the bottom of the casing 10 and into a receptacle, as at 37$^a$.

From the foregoing description and by reference to the drawings it will be understood that my improved rice hulling, polishing, and cleaning machine is exceedingly compact, is extremely light and portable, and is very economically manufactured. The bottom and one side of the outer casing 10 are utilized to form portions of the inclosing casings for the scouring mechanism and for the blast-fan, and, moreover, the bottom of the casing 10 forms the lower side of the blast-trunk leading from the fan-casing. This construction, while exceedingly economical, is also advantageous in facilitating the assembling and disassembling of the parts. The air-intake for the fan is formed by an opening in the bottom of the casing 10.

Having thus described my invention, I claim—

The combination of a casing formed as a complete inclosure at the sides and bottom and having a blast-opening at one end and a discharge-opening in the bottom, a fan, an inclosed scouring mechanism, gearing for connecting and driving said parts, a casing secured within the main casing and formed of metal shaped to constitute, in connection therewith, a casing for the fan and a horizontal blast-trunk continuous with the scourer casing and joined to the blast-opening in the end wall and provided with an opening through which the material falls from the scourer to the discharge-opening, substantially as described.

In testimony that I claim the foregoing as my own I have hereto affixed my signature in the presence of two witnesses.

JAMES TAYLOR $\overset{\text{his}}{\times}$ CLARK.
$\phantom{JAMES TAYLOR}$ mark Witnesses:
N. A. WOODHAM,
W. T. RALEY.